(12) United States Patent
Podlas

(10) Patent No.: US 7,066,996 B2
(45) Date of Patent: Jun. 27, 2006

(54) JOINT COMPOUNDS USING THICKENERS PREPARED FROM RAW COTTON LINTERS

(75) Inventor: Thomas J. Podlas, Hockessin, DE (US)

(73) Assignee: Hercules Incorporated, Wilmington, DE (US)

( * ) Notice: Subject to any disclaimer, the term of this patent is extended or adjusted under 35 U.S.C. 154(b) by 0 days.

(21) Appl. No.: 11/113,476

(22) Filed: Apr. 25, 2005

(65) Prior Publication Data

US 2005/0235878 A1  Oct. 27, 2005

Related U.S. Application Data

(60) Provisional application No. 60/565,643, filed on Apr. 27, 2004.

(51) Int. Cl.
 *C08L 1/26* (2006.01)
 *C08L 1/28* (2006.01)
 *C09D 101/26* (2006.01)
 *C09D 101/28* (2006.01)

(52) U.S. Cl. .................. 106/172.1; 106/780; 106/801; 106/140.1; 106/162.8; 106/162.82; 106/175.1; 106/191.1; 106/194.2; 106/197.01; 524/36; 524/42; 524/43; 524/44

(58) Field of Classification Search .................. 524/36, 524/42, 43, 44; 106/780, 801, 140.1, 162.8, 106/172.1, 175.1, 191.1, 194.2, 197.01
See application file for complete search history.

(56) References Cited

U.S. PATENT DOCUMENTS 2,694,633 A * 11/1954 Pattilloch .................... 162/182
5,028,342 A *  7/1991 Opitz et al. .................. 507/113

FOREIGN PATENT DOCUMENTS

DE              4034709 A1 *  5/1991

* cited by examiner

*Primary Examiner*—David Brunsman
(74) *Attorney, Agent, or Firm*—David Edwards

(57) ABSTRACT

A mixture composition of a cellulose ether made from raw cotton linters and at least one additive is used in a ready mixed joint compound composition wherein the amount of the cellulose ether in the joint compound composition is significantly reduced. When this joint compound composition is mixed with water and applied to a substrate, the water retention, sag resistance, and workability of the wet joint compound are comparable or improved as compared to when using conventional similar cellulose ethers.

55 Claims, No Drawings

JOINT COMPOUNDS USING THICKENERS PREPARED FROM RAW COTTON LINTERS

This application claims the benefit of U.S. Provisional Application No. 60/565,643, filed Apr. 27, 2004.

FIELD OF THE INVENTION

This invention relates to a mixture for use in ready-mixed joint compounds. More specifically, this invention relates to a cellulose ether mixture for use as a rheology modifier and water retention agent for use in ready mixed joint compounds. This invention also relates to a joint compound using the above-mentioned mixture wherein the cellulose ether is prepared from raw cotton linters.

BACKGROUND OF THE INVENTION

Wallboard is generally installed in large panels, which are nailed, screwed, or glued to the studding of walls of buildings. The joints where sections of the wallboard are butted together are covered with a joint compound and then a fiberglass or paper reinforcing tape is embedded within the joint compound and then permitted to dry. When the joint compound is dry, a second application of the joint compound is applied over the joint and is permitted to dry. A coating of the joint compound is also applied to cover nail heads or screws or any cracks in the wallboard and let dry. After the joint compound dries, the joint and covering of the nails or screws are lightly sanded and the wall is then finished with decorating material such as paint.

Cellulose ethers (CEs) represent an important class of commercially important water-soluble polymers for use as rheology modifiers. These CEs are capable of increasing viscosity of aqueous media. This viscosifying ability of a CE is primarily controlled by the CE's molecular weight, chemical substituents reacted with the cellulose, and conformational characteristics of the polymer chain. CEs are used in a broad range of different application fields and products such as construction, paints, and a wide variety of other applications.

Cellulose ethers used in tape joint compounds must function to increase the viscosity of the joint compound, and provide sufficient water retention, allowing the troweled joint compound to wet the wallboard and tape substrates at a controlled rate so that penetration of the compound into the substrates occurs. Upon drying, a strong adhesion bond among the joint compound, wallboard and paper tape is then achieved. The cellulose ether also controls the joint compound rheological properties, making it easier for the craftsman to apply and trowel the compound to form a smooth, homogeneous surface on the substrate. The compound must retain its water for extended periods of time, so that the artisan may work with a given aliquot of joint compound that does not dry out quickly due to rapid water loss by either evaporation or absorption of the water into the substrates. To achieve these properties, methylhydroxypropylcellulose (MHPC), methylhydroxyethylcellulose (MHEC), hydroxyethylcellulose (HEC), hydrophobically modified hydroxyethylcellulose HMHEC), and blends thereof are typically used. It is known that the higher the molecular weight of the cellulose ether, the stronger is the immobilization of the water in joint compounds and other construction materials.

A second way to benefit from high water demand is to leave the water level unchanged, but lower or eliminate the clay. Ready mix joint compounds contain clay as an agent to impart needed rheology and other properties to the compound. Controlled interaction with the water-soluble polymer (WSP) is needed to maximize these properties. Even when these interactions are under control, there are often other difficulties when the clay is present at typical (1.5–3 wt %) levels; these difficulties include: 1) cracking of the joint compound upon drying; 2) thickening of the joint compound as it ages; and 3) the need to normalize clay and water levels due to the variable nature of clay, a natural product. These are the most common difficulties with clay, especially attapulgite which is typically used.

A need still exists in the joint compound industry for a water retention agent that can be used in a cost effective manner to improve the application and performance properties of joint compounds. In order to assist in achieving this result, it would be preferred to provide a water retention agent that provides a 2% aqueous solution Brookfield viscosity preferably greater than about 80,000 mPas (as measured using a Brookfield RVT viscometer at 20° C. and at 20 rpm using Spindle number 7) and still be cost effective for use as a thickener and water retention agent. There is also a need to eliminate the above mentioned difficulties associated with the use of clay in joint compound formulations. Therefore, it is desirable to eliminate or reduce the use level of clay injoint compound formulations.

U.S. patent application Ser. No. 10/939,815, filed Sep. 13, 2004, discloses the use of specific carboxymethylcellulose (CMC) derivatives in order to significantly reduce the amount of clay in a joint compound. While this technology is solid and promising, situations could arise in which it may be difficult to employ CMC in a joint compound. For example, when dolomitic limestone or inorganic salts are present in the formulation, the CMC, which is an anionic polymer, may interact with limestone or inorganic salts and may lose some of its effectiveness as a thickener and water retention agent. By using a nonionic water soluble polymer (WSP), such a possibility could be precluded.

SUMMARY OF THE INVENTION

The present invention relates to a mixture composition for use in ready mixed joint compounds of a cellulose ether in an amount of 20 to 99.9 wt % of alkylhydroxyalkylcelluloses or hydroxyalkylcelluloses, or mixtures thereof, prepared from raw cotton linters (RCL) and at least one additive in an amount of 0.1 to 80 wt % of organic or inorganic thickening agents, anti-sag agents, air entraining agents, wetting agents, defoamers, dispersants, calcium-complexing agents, retarders, accelerators, redispersible powders, biopolymers, or fibres. When the mixture composition is used in a ready mixed joint compound formulation and is mixed with a sufficient amount of water, the ready mixed joint compound formulation produces a paste that can be applied to substrates wherein the amount of the mixture in the paste is significantly reduced while water retention, sag-resistance, and workability of the wet joint compound are improved or comparable as compared to when using conventional similar cellulose ethers.

The present invention, also, is directed to a drying type joint compound composition of a binder, a filler, a biocide, and a thickener and water-retaining agent of at least one cellulose ether prepared from raw cotton linters. When the dry joint compound composition is mixed with a sufficient amount of water, the composition produces a paste that can be applied to substrates wherein the amount of the thickener and water retaining agent in the paste is significantly reduced while water retention, sag-resistance, and workability of the wet joint compound are improved or comparable as compared to when using conventional similar cellulose ethers.

DETAILED DESCRIPTION OF THE INVENTION

It has been surprisingly found that certain cellulose ethers, particularly, alkylhydroxyalkylcelluloses and hydroxyalkylcelluloses, made from raw cotton linters (RCL) have unusually high solution viscosity relative to the viscosity of conventional, commercial cellulose ethers prepared from purified cotton linters or high viscosity wood pulps.

In accordance with this invention, cellulose ethers of alkylhydroxyalkylcelluloses and hydroxyalkylcelluloses are prepared from cut or uncut raw cotton linters. The alkyl group of the alkylhydroxyalkylcelluloses has 1 to 24 carbons atoms and the hydroxyalkyl group has 2 to 4 carbon atoms. Also, the hydroxyalkyl group of the hydroxyalkylcelluloses has 2 to 4 carbon atoms. These cellulose ethers provided unexpected and surprising benefits to the joint compound paste. Because of the extremely high viscosity of the RCL-based CEs, very efficient application performance in joint compounds could be observed. Even at lower use level of the RCL based CEs as compared to currently used high viscosity commercial CEs, similar or improved application performance with respect to water retention and consequently correction time, applicability, and sag-resistance of the joint compound paste are achieved.

In accordance with the present invention, the ready mixed joint compound composition when mixed with sufficient amount of water produces a wet joint compound with greater water demand than obtained with conventional cellulose ethers, resulting in improved workability (slip) of the joint compound and longer open time. The joint compound can be applied with a trowel, broadknife or automated tools on wallboard or other substrates. When the industry standard amount of 1.5 to 3.0% of clay levels is used, the level of thickener in the present invention can be reduced by as much as 10–25% below that typically used in the industry standard with conventional cellulose ethers; this is a result of the high thickening efficiency and water retaining capacity of the nonionic cellulose ethers produced from raw cotton linters.

The attapulgite clay in the ready mixed joint compound can be significantly reduced below the typical 1.5–3 wt % use level, resulting in reduced cracking and other benefits not universally obtained with conventional cellulose ethers, as an option to increasing the water content of the joint compound, in instances where the increased mount of water might cause increased shrinkage or be detrimental to other joint compound performance properties. By using the RCL based cellulose ethers of the present invention, the attapulgite clay in the ready mixed joint compound formulations can be totally eliminated, resulting in improved cracking, pocking, less shrinkage and greater stability of the joint compound as the joint compound ages in the container.

It, also, was reasoned that the use of high molecular weight and high viscosity nonionic cellulose ethers made from raw cotton linters in joint compounds would allow the use of increased water levels in the joint compound, thereby improving the lubricity during troweling and smoothing the applied compound, and positively affecting the other performance properties.

The RCL based, water-soluble, nonionic CEs of the present invention include (as primary CEs) particularly, alkylhydroxyalkylcelluloses and hydroxyalkylcelluloses, made from raw cotton linters (RCL). Examples of such derivatives include methylhydroxyethylcelluloses (MHEC), methylhydroxypropylcelluloses (MHPC), methylethylhydroxyethylcelluloses (MEHEC), ethylhydroxyethylcelluloses (EHEC), hydrophobically modified ethylhydroxyethylcelluloses, (HMEHEC), hydroxyethylcelluloses (HEC), and hydrophobically modified hydroxyethylcelluloses (HMHEC), and mixtures thereof. The hydrophobic substituent can have 1 to 25 carbon atoms; they can have, where applicable, a methyl or ethyl degree of substitution (DS) of 0.5 to 2.5, a hydroxyalkyl molar substitution (HA-MS) of about 0.01 to 6, and a hydrophobic substituent molar substitution (HS-MS) of about 0.01 to 0.5 per anhydroglucose unit. These water-soluble, nonionic CEs are of primary importance and are efficient thickener and water retention agents in joint compound applications.

In practicing the present invention, conventional CEs made from purified cotton linters and wood pulps (secondary CEs) can be used in combination with the above mentioned RCL-CEs to further provide other properties to the joint compound without detracting from the unique benefits of the primary CEs. These secondary CEs will be referred to in this application as conventional CEs because most of them are commercial products or known in the marketplace and/or literature.

Examples of the secondary CEs are methylcellulose (MC), methylhydroxyethylcellulose (MHEC), methylhydroxypropylcellulose (MHPC), hydroxyethylcellulose (HEC), ethyl hydroxyethylcellulose (EHEC), hydrophobically modified hydroxyethylcellulose (HMHEC), hydrophobically modified ethylhydroxyethylcellulose (HMEHEC), methylethylhydroxyethylcellulose (MEHEC), sulfoethyl methylhydroxyethylcelluloses (SEMHEC), sulfoethyl methylhydroxypropylcelluloses (SEMHPC), and sulfoethyl hydroxyethylcelluloses (SEHEC). These secondary CEs can be commercially available CEs in the market place or can be prepared by any conventional process using purified cotton linters or wood chips or any other starting materials known in the industry. These additional CEs also include non RCL primary CEs that are outside the scope of the primary CEs, such as MHPC or MHEC that has lower molecular weight.

In accordance with the present invention, in the mixture composition the amount of the CEs is 20 to 99.9 wt %, preferably 70 to 99.5 wt %. The amount of the at least one additive in the mixture composition is 0.1 to 80 wt %, preferably 0.5 to 30 wt %.

The mixture of the present invention can be marketed directly or indirectly to joint compound manufacturers who can use such mixtures directly in their manufacturing facilities. The mixture composition can be custom blended to preferred requirements of different manufacturers.

Additives of the mixture composition of the present invention include at least one additive of organic or inorganic thickening agents and/or secondary water retention agents, anti-sag agents, air entraining agents, wetting agents, defoamers, dispersants, calcium-complexing agents, retarders, accelerators, redispersible powders, biopolymers, and fibres. Other examples of additives are calcium chelating agents, fruit acids, and surface active agents.

Specific examples of these other additives include homo- or co-polymers of acrylamide, polyethylene glycol, casein, naphthalene-sulfonate, sulfonated melamine-formaldehyde condensate, sulfonated naphthalene-formaldehyde condensate, polyacrylates, polycarboxylate ether, fruit acids, phosphates, phosphonates, calcium salts of organic acids having 1 to 4 carobn atoms, bentonite, montmorillonite, sepiolite, cellulose fibres, and homo-, co-, or terpolymers based on vinyl acetate, maleic ester, ethylene, butadiene, vinyl versatate, and acrylic monomers.

An example of an organic thickening agent is a polysaccharide. Examples of such polysaccharides are starch ether, starch, guar, guar derivatives, dextran, chitin, chitosan, xylan, xanthan gum, welan gum, gellan gum, mannan, galactan, glucan, arabinoxylan, alginate, and cellulose fibres.

Specific examples of the guar derivative are hydroxypropyl guar, methylhydroxypropyl guar, carboxymethyl guar, carboxymethylhydroxypropyl guar, cationic guar and mixtures thereof.

Specific examples of the homo- or co-polymers of acrylamide are poly(acrylamide-co-sodium acrylate), poly(acrylamide-co-acrylic acid), poly(acrylamide-co-sodium-acrylamido methylpropanesulfonate), poly(acrylamide-co-acrylamido methylpropanesulfonic acid), poly(acrylamide-co-diallyldimethylammonium chloride), poly(acrylamide-co-(acryloylamino)propyltrimethylammoniumchloride), poly(acrylamide-co-(acryloyl)ethyltrimethylammoniumchloride), and mixtures thereof.

The mixture compositions of this invention can be prepared by a wide variety of techniques known in the prior art. Examples include simple dry blending, spraying of solutions or melts onto dry materials, co-extrusion, or co-grinding.

In accordance with this invention, the mixture composition when used in a dry joint compound formulation and mixed with a sufficient amount of water to produce a joint compound paste, the amount of the mixture, and consequently the cellulose ether, is significantly reduced. The reduction of the mixture or cellulose ether, can be at least 5%, preferably 10%. Even with such reduced use level of the primary CE, the water retention, sagresistance, and workability of the wet joint compound are comparable or improved as compared to when using conventional similar cellulose ethers.

Since joint compounds prepared using these RCL based CEs required increased water demand, these products showed a lubricating effect (known in the trade as "slip") that made their application less difficult. Should the increased water levels result in unacceptable cracking or increased shrinkage of the joint compound upon drying, alternatively the use level of the RCL CEs can be reduced below that typically used with conventional cellulose ethers. Furthermore, the use of RCL based CEs, allows one to reduce or eliminate the use of attapulgite clay from the formulation leading to less cracking and less pocking upon drying. In certain formulations, it is practical to eliminate mica. The RCL based CE will assume the role of the mica, giving improved working properties (slip); mica also helps reduce cracking in typical joint compounds; cracking is due at least in part to the presence of attapulgite clay; hence, by using reduced amount of clay or completely eliminating clay from the formulation, this eliminates the need for the use of mica can be eliminated.

In accordance with the present invention, one preferred embodiment makes use of MHEC or MHPC having a 2% aqueous solution Brookfield viscosity of greater than 80,000 mPas, preferably greater than 90,000 mPas, as measured on a Brookfield RVT viscometer at 20° C., 20 rpm using a spindle number 7.

TABLE 1

Analytical Data

| Sample | methoxyl/ hydroxyethoxyl [%] | viscosity on dry basis At 2 wt-% [mPas] | at 1 wt-% [mPas] | moisture [%] | surface tension** [mN/m] | NaCl [%] |
|---|---|---|---|---|---|---|
| RCL-MHPC | 26.7/2.9 | 98000 | 17000 | 2.2 | 35 | 0.11 |
| Standard MHPC, mid viscosity 20000 PFR | ~28/3.0 | ~25000 | ~2800 | 3.0 | 47 | 0.55 |
| Standard high viscous MHPC C4046, Aqualon | 27.9/3.0 | 64100 | 7300 | n.d. | 48 | n.d. |
| RCL-MHEC | 23.3/8.4 | 96000 | 21500 | 2.2 | 43 | 0.36 |
| Standard high viscous MHEC, ME 6590, Aqualon | ~27.5/9.0 | ~62000 | 7050 | 1.9 | 53 | 0.76 | n.d. = not determined
*typical average viscosity for this product
**0.1 wt-% aqueous solution at 20° C.

Table 1 shows the analytical data of a methylhydroxyethylcellulose and a methylhydroxypropylcellulose made from RCL. The results clearly indicate that these products have significantly higher solution viscosities than analogous, commercially available high viscosity CEs. At a concentration of 2 wt-%, viscosities of the RCL-MHEC and RCL-MHPC were about 100,000 mPas. Because of their high values, it was more reliable and easier to measure viscosities of 1 wt % aqueous solutions. At 1 wt % concentration, the commercially available high viscous methylhydroxyethylcelluloses and methylhydroxypropylcelluloses showed viscosities in the range of 7050 to 7300 mPas (see Table 1). The measured values for the products based on raw cotton linters were significantly higher than the commercial materials. Moreover, it is clearly indicated in Table 1 that the cellulose ethers which are based on raw cotton linters have lower surface tensions than the control samples.

In accordance with the present invention, the ingredients of typical prior art joint compound compositions are shown in Table 2, infra.

In accordance with a preferred embodiment of the invention, cellulose ethers are prepared according to U.S. patent application Ser. No. 10/822,926, filed Apr. 13, 2004, which is herein incorporated by reference. The starting material of the present invention is a mass of unpurified raw cotton linter fibers that has a bulk density of at least 8 grams per 100 ml. At least 50 wt % of the fibers in this mass have an average length that passes through a US sieve screen size number 10 (2 mm openings). This mass of unpurified raw cotton linters is prepared by obtaining a loose mass of first cut, second cut, third cut and/or mill run unpurified, natural, raw cotton linters or mixtures thereof containing at least 60% cellulose as measured by AOCS (American Oil Chemists' Society) Official Method Bb 3-47 and comminuting the loose mass to a length wherein at least 50 wt % of the fibers pass through a US standard sieve size no. 10. The cellulose ether derivatives are prepared using the above mentioned comminuted mass of raw cotton linter fibers as the starting material. The cut mass of raw cotton linters are first treated with a base in a slurry or high solids process at a cellulose concentration of greater than 9 wt % to form an activated cellulose slurry. Then, the activated cellulose slurry is reacted for a sufficient time and at a sufficient temperature with an etherifying agent or a mixture of etherifying-agents to form the cellulose ether derivative, which is then recovered. The modification of the above process to prepare the various CEs of the present invention is well known in the art.

The CEs of this invention can also be prepared from uncut raw cotton linters that are obtained in bales of the RCL that are either first, second, third cut, and/or mill run obtained from the manufacturers.

When compared with the joint compounds prepared with conventional cellulose ethers as the rheology modifier and water retention agent, the joint compounds of this invention exhibit improved performance properties in that they have higher water demand, and allow one to use less crack-inducing attapulgite clay or eliminate the attapulgite from the formulation leading to reduced cracking or no cracking at all.

Water Retention

"Water retention" is defined as the ability of a fresh wet joint compound to retain its water when applied to a virgin substrate.

Water retention is measured by spreading on nylon mesh or similar netting a fixed amount of wet joint compound to a constant depth of between 0.5–1.0 cm. The mesh is situated atop wallboard. The joint compound-containing mesh is removed from the wallboard and periodically weighed after 1, 3, 5, 7.5 and 10 minutes. Knowing the initial weight of joint compound and its water content, the water retention is readily calculated. The greater the water retained by the joint compound, the greater the water retention ability of the cellulose ether while the joint compound is being troweled. The improved water retention ability of the CE offers improved workability and longer open time.

Sag Resistance

"Sag resistance" is defined as the ability of a vertically applied fresh paste to keep its position on the wall, i.e., a good sag resistance prevents the fresh paste from flowing down the wall.

Sag resistance is measured by troweling joint compound onto a wallboard to a depth similar to that used for the water retention test. The board is then placed in a perpendicular position, and its shape retention monitored. The joint compound should not flow or run down the board (rating 5 out of 5). Slight shape distortion is acceptable (rated 4). Any flow lowers the rating, and a flow of <1 cm, rated 3, is the minimum acceptable rating. Greater flow than 1 cm will cause difficulties while troweling, necessitating repeated passes to homogenize the depth and texture of the troweled joint compound.

Workability

"Workability" is defined as the sum of the application properties of the joint compound which give it suitability. This term is a subjective term determined by the user.

Workability is measured by taking a given weight of paste and troweling it down or across a given length of wallboard. The ease of troweling, sag resistance, ability to obtain a crack-free and crater-free layer and other subjective factors are all taken into account to come up with a workability rating. Other parameters that are used in determining this term include mixing behavior, applicability, adjustability, and/or correction time.

A typical ready-mix joint compound contains the following components:

TABLE 2

Typical Prior Art Composition of Joint Compounds

| Component | Lightweight joint compound | Regular weight joint compound |
|---|---|---|
| Ground CaCO3 | 49–50% | 60–63% |
| Attapulgite clay | 1.5–3.5% | 1.5–2.5% |
| Mica | — | 2–6% |
| Perlite | 5–8% | — |
| Binder, polyvinyl acetate (PVA) or ethylene vinyl acetate (VAE) latex | 2–2.5% | 2–2.5% |
| Biocide | 0.1% | 0.1% |
| Thickener | 0.4–0.6% | 0.4–0.6% |
| Water | 39–42% | 30–32% |

Other ingredients may be used in the joint compound formulation, depending on the needs of the work environment which are well known to those skilled in the art. The other additional ingredients include, but are not limited to, talc, sepiolite clay, kaolin clay, gypsum, hydrated gypsum, polyvinyl alcohol, starch and starch derivatives, sorbitol, defoamers, glycols such as diethylene glycol or propylene glycol, polyacrylamide and polyacrylic acid salts, inorganic buffers, sequestrants such as alkali salts of citric and other weak acids, and other additives used regionally to modify specific joint compound characteristics to suit the local preferences.

In accordance with the present invention, the joint compound compositions contain a binder, a thickener system, a filler, water, and a biocide. Additional ingredients that are optionally used in joint compounds are wetting agents, defoamers, and plasticizers. These additional ingredients are normally used in minor amounts generally ranging from about 0.05 to about 1.0% based on the total dry weight of the composition. Other ingredients that can be optionally used are clays and/or mica where each can be present in an amount of up to 2 wt %. The ready-mixed joint compound composition of the present invention has a density of 12 to 14 pounds per gallon (ppg) for the regular weight tape joint compound formulation and 8 to 10 ppg for the lightweight formulation.

Binder:

The commonly used binders in ready mixed, joint compound compositions are latex emulsions such as ethylene vinyl acetate or a poly (vinyl acetate) latex. The resinous binder is a coalescent agent that upon drying of the joint compound forms a thin matrix to hold the clay, mica, limestone, and rheology modifier. In other words, the binder is the matrix that holds the other ingredients in their proper places so as to form the desired composite product. Hence, the binder is an essential ingredient in the joint compound. Other materials that can be used as binders include starch, casein, polyacrylamide, and copolymers of acrylamide and acrylic acid. In general, the use level of latex binder ranges from about 1% to about 3%, preferably with an upper limit of 2.5 wt %, based on the total weight of the composition.

Thickener System:

The water soluble nonionic CEs of the present invention include alkylhydroxyalkyl celluloses and hydroxyalkyl celluloses and mixtures thereof, prepared from raw cotton linters as described above.

Other rheology modifiers can be used as secondary CEs in combination with the RCL-based products as described above. These secondary rheological modifiers can be prepared from purified cotton linters and woods pulps.

The amount of the CE thickener system in the joint compound composition can range from about 0.1% to 0.54%, preferably 0.2% to 0.45%, by weight based on the total weight of the joint compound ingredients (including the water present in the joint compound composition). Note that the "thickener system" can contain a single RCL based CE or a mixture of a RCL based CE and a conventional CE or a mixture of at least one RCL based CE in combination with minor amounts of additives.

Fillers:

Fillers are an important ingredient in joint compounds. They serve the purpose of adding body to the joint compound, making the compound economical, and controlling the pH of the composition. Conventional fillers that can be used either alone or in combination in the present invention include calcium carbonate, calcium sulfate dihydrate (gypsum), and dolomitic limestone. Calcium sulfate hemihydrate (plaster of Paris) may be used as a minor component in the presence of other fillers in order to better control open time and cracking and other joint compound properties.

The preferred filler is finely ground calcium carbonate. The filler is a dry powder, which usually is composed of at least about 50% by weight of the joint compound composition, and generally falls within the range of about 45 to about 65% by weight. In order to achieve the desired pH of the composition of 8 to 10, the filler is the principal alkaline ingredient and, therefore, is the main ingredient that controls the pH. If for some reason, the filler cannot provide the adequate adjustment of the pH, if necessary, a pH modifier may be also added to increase the alkalinity of the composition.

Water:

Water is added to the dry ingredients of the ready mixed joint compound to provide the viscosity of the joint compound composition generally in the range of from about 400 to about 700 Brabender units. When the dry ingredients are mixed with water on site, the amount of added water to form the joint compound will depend on the desired viscosity.

Biocide:

A biocide is an important ingredient in joint compound compositions. They increase the shelf life and prevent the composition from spoiling. In other words, biocides prevent the growth of microorganisms, such as mold, bacteria and fungi, from growing in the composition and also on the walls of the building structure in which it is used. Examples of two efficient industry-accepted biocides are:

Troysan® 174 product, (2[(Hydroxymethyl) amino]ethanol), a broad spectrum biocide, marketed by Troy Chemical Corp.; and, Proxel® GXL product, (1,2-benzisothiazolin-3-one), an all purpose biocide; marketed by Avecia.

The biocide should generally be present in the amount ranging from about 0.05 to about 0.2% by weight based on the total weight of the ingredients.

Clay:

In accordance with the present invention, clays are an optional ingredient. However, when present, suitable clays for use in a joint compound are any of the natural earthy, fine-grained, largely crystalline substances of hydrous aluminum silicates usually containing alkali and alkaline earth metal ions, and iron that make up the group of clay materials. Included in this group are attapulgite, sepiolite, montmorillonite, bentonite, illite, and kaolin. Attapulgite is the preferred clay. Attapulgite is typically used at levels ranging from 0.2 to 2.0% of the total weight of the joint compound. It has been found that positive affects of the clay out weigh the negative effects when used in the amount equal to or less than about 0.5% in regular weight and 0.75% in lightweight joint compounds.

Miscellaneous Ingredients:

If a lightweight joint compound having improved crack resistance is desired, the lightweight property can be provided by incorporating specially treated expanded perlite into the formulation. It is well known in the art that the expanded perlite should have a particle size, which will pass through a 100-mesh screen, if it is to be incorporated into a joint compound. The expanded perlite is a lightweight material which contains many fine fissures which may be penetrated by water and could thereby destroy its ability to render the joint compound lightweight. As a result, the expanded perlite is often treated to render it water-insensitive. The preferred method is to coat the expanded perlite with a silicone compound but other materials may be used to render it water-insensitive. The specially treated expanded perlite is commercially available from suppliers such as Silbrico Corporation. If non-treated perlite is used, care is to be taken to prevent undue water absorption during manufacture and over the expected shelf life of the joint compound. The lightweight joint compounds illustrated herein were prepared using Silbrico's SilCell® 3534 product, a surface treated perlite that is commonly used in the industry. In the present invention, perlite has an upper limit of 8.0 wt %.

Depending on local preferences, other ingredients may be used in the joint compound formulation. These include air entraining agents, surfactants, humectants, pH buffering salts, and defoamers.

Mica is another optional ingredient that is either significantly reduced or eliminated in the present invention. As shown in Table 2 above, in prior art joint compounds mica is usually not used in lightweight joint compounds but is used typically in amounts of 2 to 6 wt % in regular weight joint compounds. In the present invention, in regular weight joint compounds the amount of mica, when present, has an upper limit of 3.0 wt %, preferably 2.0 wt %. In lightweight joint compound formulations, mica is not used. Without the mica both lightweight and regular weight joint compounds of the present invention showed significant improvement over similar joint compound formulations using conventional cellulose ethers.

Normally, joint compounds can be prepared by combining all of the wet ingredients and mixing sufficiently to homogenize. A blend of all the solids is then added to the mixing bowl, with continuing mixing. The entire mass is blended for a total of up to 20 minutes. Different manufacturers may modify this procedure.

EXAMPLES

The following Examples illustrate the practice of the present invention, which has industrial applicability in the construction industry. Parts and percentages are by weight unless otherwise indicated. Viscosity was measured in Brabender units (B.U.) determined by ASTM C-474-67. Adhesion was also measured by ASTM C-474-67. Joint compound preparation techniques are given immediately below.

Standard Joint Compound Preparation Technique

The ingredients of the Examples were intimately mixed using a standard Hobart planetary blender. The joint compounds were prepared in 1000 gram quantities, including the water. All of the liquid ingredients were added to the mixing bowls and stirred for 20–30 seconds. A pre-blend of all dry ingredients was made by weighing the required amounts of each component into a jar of sufficient volume so that the ingredients could be briefly shaken to effect blending. These dry ingredients were then added to the mixing bowl while in the "on" position at the lowest speed. The addition of all solids was done over a 15 second period of time. The mixture was blended for two minutes, during which time a cohesive paste formed. The mixing was stopped so that material on the sides of the mixing bowl and within the mixing blades could be scraped off and returned to the main body of the paste. Mixing was then resumed for 8 minutes, after which the scraping was again carried out. A final 5 minutes of mixing was performed to assure complete wetting and uniform distribution of all ingredients. The joint compound was then covered and allowed to stabilize for from 16 to 24 hours. At this time, after slight mixing by hand, the viscosity was measured, as shown in Tables 3 and 4. If necessary the joint compound viscosity was reduced to 400 to 425 BU by further addition of small amounts of water, generally less than 3% by weight of total joint compound. The testing of the joint compounds then was performed.

Determination of Cracking

For cracking determination, a joint compound was troweled in a 2"×3"×¼" plastic mold, the surface smoothed out with only one pass of the trowel, allowed to dry to constant weight, after which the degree of cracking was measured.

Numerical Ratings: Cracking:
5: None
4: Trace
3: Slight
2: Moderate
1: Heavy

The following Table A sets forth the composition of the ingredients used in Examples 1 and 2.

TABLE A

Joint Compound Compositions

| Component | Lightweight joint compound | Regular weight joint compound |
| --- | --- | --- |
| Ground CaCO3, Georgia White #9, Georgia Marble Co. | 49–51% | 63–65% |
| Attapulgite Clay, Gel B | 0–2% | 0–2% |
| Mica, P80K, | — | 0–1.5% |
| Perlite | 6% SilCell 3534, Silbrico | — |
| Binder, PVA or VAE latex | 2.5%, CS104, Forbo, PVA | 2.45%, Airflex 526BP, VAE, Air Products Co, |
| Biocide Troysan 174, Troy Chemical | 0.1% | 0.05% |
| Thickener | 0.32–0.6% | 0.32–0.4% |
| Water | 39–42% | 29.5–32.5% |

NOTE: Water and CaCO3 levels vary as the attapulgite clay level vanes.

Example 1

Application Test of Raw Cotton Linters (RCL) Based MC-Derivatives in All-Purpose, Regular Weight Joint Compound Methylhydroxypropylcellulose (MHPC) made from raw cotton linters was tested in joint compound application in comparison to commercially available Culminal®MHPC (available from Hercules) as the control. All-purpose, regular weight joint compounds were formulated to have a density of approximately 13–14 ppg (pounds per gallon) (1.5–1.7 g/cc). The control cellulose ethers were made from purified cotton linters. The results are shown in Table 3 below.

TABLE 3

Regular weight joint compound

| Cellulose ether | CE dosage [%], (if not 2%, clay also given) | % water | consistency Brabender @ 79 rpm [BU] | low shear (10 rpm) Brabender Viscosity | crack resistance (rated 1–5; 5 = no cracks upon drying) | initial workability/ slip/ spreadability |
| --- | --- | --- | --- | --- | --- | --- |
| RCL MHPC | 0.40 | 32.5 | 455 | 640 | 4 | very good–excellent |
| RCL MHPC | 0.32 | 32.5 | 380 | 560 | 4 | Very good but for (slightly) short open |
| Culminal MHPC 20000 PFR | 0.40 | 30.5 | 450 | 710 | 4 | very good |
| Culminal | 0.40 | 30.0 | 250 | 450 | 3–4 | Poor sag, |

TABLE 3-continued

Regular weight joint compound

| Cellulose ether | CE dosage [%], (if not 2%, clay also given) | % water | consistency Brabender @ 79 rpm [BU] | low shear (10 rpm) Brabender Viscosity | crack resistance (rated 1–5; 5 = no cracks upon drying) | initial workability/ slip/ spreadability |
|---|---|---|---|---|---|---|
| MHEC, ME 6590 | (0% clay) | | | | | difficult to manipulate |
| RCL MHEC | 0.40 (0% clay) | 31.5 | 450 | 500 | 4 | Very good |
| RCL MHPC | 0.40 (0% clay) | 31.5 | 470 | 475 | 5 | Very good |
| Culminal MHPC C4046 | 0.40 (0.25% clay) | 30.5 | 455 | 275 | 4 | Fair–good sag, needs improvement |
| RCL MHPC | 0.40 (0.25% clay) | 32.5 | 450 | 315 | 4 | Slightly weak body, but very good sag |

Addition level of the cellulose ether was either 0.32% or 0.40% based on total weight of joint compound. Consistency of the joint compounds was adjusted to 450 (±10) BU (Brabender Units @ 79 rpm shear rate). In order to reach the target consistency, the water level of the raw cotton linters based product had to be higher (32.5% instead of 30.5%). In comparison to the control sample, the low shear viscosity of the joint compound that contained the RCL MHPC product was less than that of the control, so that it was easier to remove the former from its bucket, trowel it onto the wallboard and spread it down the length of the wallboard to cover the paper tape so as to form a cohesive unit upon drying. After drying, cracking was the same with the two joint compounds. Normally, an increase of water content at the same CE addition level would result in more cracking upon drying. Surprisingly, this was not the case with the RCL based MHPC. The improved initial spread without altering the basic properties of the joint compound, especially not causing the detrimental effect of increased cracking was a significant technological breakthrough for joint compounds.

Not only did the decreased-low shear viscosity with respect to the control MHPC make it easier to apply and spread the joint compound prepared with the RCL based MHPC, but, a definite improvement in lubricity was noted during the application process. This lubrication effect from these raw linters based MHPC products was independent of viscosity, and it made it easier to apply and work with these joint compounds during the course of the day without the craftsman suffering from undue fatigue due to lack of such lubrication effects.

The positive effects from raw linters based cellulose ethers in joint compounds will also be noted in latex-based carbonate-containing tile adhesives, caulking materials, texture products and similar construction materials.

Tests 4 to 6 of Table 3 give evidence of the ability to eliminate clay when RCL MHEC and RCL MHPC are the thickeners of choice. The MHEC (ME6590) made with standard cellulose furnish, gives a very low viscosity joint compound, only 250 BU when the water level is 30.0% (test 4). It was difficult to trowel this joint compound and obtain a uniform thickness of joint compound under the trowel. Because of poor sag resistance, the joint compound readily ran down the wallboard. With the RCL products, at water levels of 31.5%, joint compound viscosities were in the 450–470 range, as required, workability, slip and spreadability were all very good. This was not possible with the standard MHEC product. Test 7 of Table 3 showed that the high viscosity standard MHPC product with 0.25% clay does not have the required sag resistance. In the absence of clay, sag resistance would be poorer. RCL MHPC with 0.25% clay had slightly weak body, but despite this, sag resistance and working properties were all very good. RCL-based MHPC and/or MHEC were needed in order to obtain acceptable working properties when clay was absent or present at the very low levels as illustrated with tests 4 and 7 of Table 3. Example 3 illustrates the ability to significantly lower the concentration of RCL MHPC (by 20%) and obtain a joint compound with essentially acceptable properties; only the open time was slightly short, less than what is often expected. All of the RCL-containing joint compounds had acceptable adhesion.

Example 2

15 Lightweight joint compounds were made to a density of 7–9 ppg using the Standard Technique mentioned above. The control cellulose ethers were based on purified cotton linters. The results are shown in Table 4 below.

TABLE 4

Lightweight joint compound

| Cellulose ether | Dosage [%] | % water | consistency Brabender @ 79 rpm [BU] | low shear (10 rpm) Brabender Viscosity | crack resistance (rated 1–5; 5 = no cracks upon drying) | initial workability/ slip/ spreadability |
|---|---|---|---|---|---|---|
| Dow Methocel J75MS | 0.40 | 40.0 | 425 | 620 | 4 | Very good |
| RCL MHPC | 0.40 | 32.5 | 455 | 640 | 4 | very good– excellent |
| RCL MHPC | 0.32 | 32.5 | 390 | 570 | 4 | Very good, needs slip improvement |
| Culminal MHPC 20000 PFR | 0.40 | 40.5 | 450 | 710 | 4 | very good |
| Culminal MHEC ME 6590 | 0.4 | 40.0 | 300 | 115 | Unstable in template | Poor, no body |
| RCL MHEC | 0.4 | 42.2 | 420 | 280 | 4–5 | excellent |
| RCL MHPC (0.75% clay) | 0.60 | 40.0 | 580 | 400 | 5 | very good |
| 20000 PFR (0.75% clay) | 0.60 | 40.0 | 340 | 190 | Not rated, unstable in template | Poor, slides off trowel |
| RCL MHPC (0.5% clay) | 0.60 | 40.0 | 570 | 370 | 4–5 | very good |
| 1:1 RCL MHPC: 20000 PFR (0.75% clay) | 0.60 | 40.0 | 440 | 330 | 4 | Good workability, some sag deficiency |
| RCL MHPC (0% clay) | 0.60 | 40.0 | 540 | 380 | 4 | very good– excellent |
| RCL MHPC (0% clay) | 0.40 | 40.0 | 340 | 200 | 4–5 | Very good workability, good sag resistance |
| MHPC C4046 (0% clay) | 0.60 | 40.0 | 410 | 225 | 4 | Poor sag. Insufficient body, air coalesces at surface. |
| MHPC 1034R (0.75% clay) | 0.60 | 40.0 | 380 | 210 | 4–5 | Very little body, not easily workable |
| Dow Methocel J75MS (0.75% clay) | 0.60 | 40.0 | 330 | 220 | 4 | Very little body, not easily workable |

Dow Methocel J75MS: 15–21% methoxyl, 15–20% hyxroxypropyl substitution. 35000 mPas viscosity @ 2% solids.
Aqualon MHPC 1034R: ~23% methoxyl/10% hydroxypropyl substitution. ~30000 mPas viscosity @ 2% solids.
Moisture levels, surface tension and NaCl contents of the above are not known. Both are purified products.
Unless noted otherwise in table 4, clay levels in the joint compounds were 2%.

The performance of RCL MHPC and MHEC products in lightweight joint compound was remarkably independent of attapulgite clay content. In the absence of clay, performance was improved over what was obtained with two commercial MHPC products as controls. Performance of control joint compounds at a 0.75% clay level, made using Methocel J75MS (available from Dow Chemical Co., Michigan) and Culminal MHPC 1034R (available from Aqualon Co.) was unsatisfactory, the joint compounds having very poor body, little or no sag resistance. Compared with the RCL MHPC in the absence of clay, it was seen that the RCL CE based product gave more than satisfactory 10 performance, giving a joint compound with excellent sag resistance and working properties. Similar behavior was seen with RCL based MHEC.

Tests 6, 8 and 9 of Table 4 are illustrative of joint compounds made with RCL MHPC with 0.75%, 0.5% and 0% clay, respectively. Viscosities were similar, as were workabilities etc. A slight improvement in workability was noted at the 0% clay level. Concurrently, a slight increase in cracking was also noted, but the 4 rating (trace of cracks) is very acceptable. It is also noted that commercial MHPC 1034R and Dow J75MS, both with 0.75% clay, gave unacceptable joint compounds. Workabilities were poor. Viscosities were also too low. Other tests of Table 4 illustrate the benefits of the RCL products. When RCL MHPC was used with the full 2% complement of clay, the water level had to be lowered to 32.5% to obtain acceptable joint compound properties. It is not feasible to lower the water level, as this makes production of the joint compounds unprofitable for the manufacturer. The use level of RCL MHPC and MHEC was increased to 0.6% when the clay levels were 0.75% or less. Standard MHPC products, even at this 0.6% level did not give acceptable properties when the clay level was 0.75% or less. Again, water levels would have to be lowered, which is unacceptable, as mentioned above.

Also illustrated in Table 4 is the joint compound test where 0.75% of clay was used and RCL MHPC was blended with a non-RCL standard MHPC. This test resulted in a joint compound that was acceptable in most ways, except that in certain circumstances improved sag resistance might be needed. An example with the full complement of clay but the RCL MHPC level lowered to 0.32% (a 20% reduction in CE concentration) showed that there is a slight deficiency in the property referred to as "slip"; all other joint compound properties were acceptable. Similar results were obtained with RCL MHEC. Similar results were obtained with regular weight joint compound. All of the RCL-containing joint compounds had acceptable adhesion.

Although the invention as been described with reference to preferred embodiments, it is to be understood that variations and modifications in form and detail thereof may be made without departing from the spirit and scope of the claimed invention. Such variations and modifications are to be considered within the purview and scope of the claims appended hereto.

What is claimed is:

1. A mixture composition for use in joint compound comprising
   a) a cellulose ether in an amount of 20 to 99.9 wt % selected from the group consisting of alkylhydroxyalkyl celluloses and hydroxyalkyl celluloses and mixtures thereof, prepared from raw cotton linters, and
   b) at least one additive in an amount of 0.1 to 80 wt % selected form the group consisting of organic or inorganic thickening agents, anti-sag agents, air entraining agents, wetting agents, defoamers, dispersants, calcium-complexing agents, retarders, accelerators, redispersible powders, biopolymers, and fibres,
   wherein when the mixture composition is used in a joint compound formulation and is mixed with a sufficient amount of water, the joint compound formulation produces a paste that can be applied to substrates, wherein the amount of the mixture in the joint compound is significantly reduced while water retention, sag-resistance, and workability of the wet joint compound are improved or comparable as compared to when using conventional similar cellulose ethers.

2. The mixture composition of claim 1, wherein the alkyl group of the alkylhydroxyalkyl celluloses has 1 to 24 carbon atoms and the hydroxyalkyl group has 2 to 4 carbon atoms.

3. The mixture composition of claim 1 wherein the cellulose ether is selected from the group consisting of methylhydroxyethylcelluloses (MHEC), methylhydroxypropylcelluloses (MHPC), hydroxyethylcellulose (HEC), ethylhydroxyethylcelluloses (EHEC), methylethylhydroxyethylcelluloses (MEHEC), hydrophobically modified ethylhydroxyethylcelluloses (HMEHEC), hydrophobically modified hydroxyethylcelluloses (HMHEC) and mixtures thereof.

4. The mixture composition of claim 3, wherein the cellulose ether, where applicable, has a methyl or ethyl degree of substitution of 0.5 to 2.5, hydroxyethyl or hydroxypropyl molar substitution (MS) of 0.01 to 6, and molar substitution (MS) of the hydrophobic substituents of 0.01–0.5 per anhydroglucose unit.

5. The mixture composition of claim 3 is MHEC and a guar derivative.

6. The mixture composition of claim 5, wherein the guar derivative is selected from the group consisting of hydroxypropyl guar, methylhydroxypropyl guar, carboxymethyl guar, carboxymethylhydroxypropyl guar, cationically modified guar and mixtures thereof.

7. The mixture composition of claim 3 is MHPC and a guar derivative.

8. The mixture composition of claim 7, wherein the guar derivative is selected from the group consisting of hydroxypropyl guar, methylhydroxypropyl guar, carboxymethyl guar, carboxymethylhydroxypropyl guar, cationic guar and mixtures thereof.

9. The mixture composition of claim 3 is HMHEC and a guar derivative.

10. The mixture composition of claim 9, wherein the guar derivative is selected from the group consisting of hydroxypropyl guar, methylhydroxypropyl guar, carboxymethyl guar, carboxymethylhydroxypropyl guar, cationically modified guar and mixtures thereof.

11. The mixture composition of claim 1, wherein the mixture also comprises one or more conventional cellulose ethers selected from the group consisting of methylcellulose (MC), methylhydroxyethylcellulose (MHEC), methylhydroxypropylcellulose (MHPC), hydroxyethylcellulose (HEC), ethylhydroxyethylcellulose (EHEC), hydrophobically modified hydroxyethylcellulose (HMHEC), hydrophobically modified ethylhydroxyethylcellulose (HMEHEC), methylethylhydroxyethylcellulose (MEHEC), sulfoethyl methylhydroxyethylcelluloses (SEMHEC), sulfoethyl methylhydroxypropylcelluloses (SEMHPC), and sulfoethyl hydroxyethylcelluloses (SEHEC).

12. The mixture composition of claim 1, wherein the amount of the cellulose ether is 70 to 99.9 wt.

13. The mixture composition of claim 1, wherein the amount of the at least one additive is 0.5 to 30 wt %.

14. The mixture composition of claim 1, wherein the at least one additive is an organic thickening agent selected from the group consisting of starch ether, starch, guar, guar derivatives, xanthan gum, welan gum, gellan gum, carrageenan, alginate, and cellulose fibres.

15. The mixture composition of claim 1, wherein the at least one additive is selected from the group consisting of homo- or co-polymers of acrylamide, polyethylene glycol, casein, naphthalene-sulfonate, sulfonated melamine-formaldehyde condensate, sulfonated naphthalene-formaldehyde condensate, polyacrylates, polycarboxylate ether, phosphates, phosphonates, bentonite, montmorillonite, sepiolite, and homo-, co-, or terpolymers based on vinyl acetate, maleic ester, ethylene, butadiene, vinyl versatate, and acrylic monomers.

16. The mixture composition of claim 1, wherein the cellulose ether has a 2% aqueous solution Brookfield viscosity of greater than 80,000 mPas as measured on a Brookfield RVT viscometer at 20° C. and 20 rpm, using a spindle number 7.

17. The mixture composition of claim 1, wherein the cellulose ether has a 2% aqueous solution Brookfield viscosity of greater than 90,000 mPas as measured on a Brookfield RVT viscometer at 0.20° C. and 20 rpm, using a spindle number 7.

18. The mixture composition of claim 1, wherein the significantly reduced amount of the mixture used in the joint compound paste is at least 5% reduction.

19. The mixture composition of claim 1, wherein the significantly reduced amount of the mixture used in the joint compound paste is at least 10% reduction.

20. A ready mixed, joint compound composition comprising a binder, filler, biocide, and a thickener and water-retaining agent of at least one cellulose ether prepared from raw cotton linters,
   wherein when the ready mixed joint compound composition is mixed with a sufficient amount of water, the joint compound composition produces a joint compound paste where the amount of the cellulose ether in the joint compound is significantly reduced while water retention, sag resistance, and workability of the joint compound mortar are improved or comparable as compared to when using conventional similar cellulose ethers.

21. The ready-mixed joint compound composition of claim 20, wherein the cellulose ether is selected from the group consisting of alkylhydroxyalkyl celluloses and hydroxyalkyl celluloses and mixtures thereof.

22. The ready-mixed joint compound composition of claim 21, wherein the alkyl group of the alkylhydroxyalkyl celluloses has 1 to 24 carbon atoms and the hydroxyalkyl group has 2 to 4 carbon atoms.

23. The ready-mixed joint compound composition of claim 20, wherein the at least one cellulose ether is selected from the group consisting of methylhydroxyethylcelluloses (MHEC), methylhydroxypropylcelluloses (MHPC), hydroxyethylcelluloseS (HEC), methylethylhydroxyethylcelluloses (MEHEC), ethylhydroxyethylcelluloses (EHEC), hydrophobically modified ethylhydroxyethylcelluloses (HMEHEC), hydrophobically modified hydroxyethylcelluloses (HMHEC) and mixtures thereof.

24. The ready-mixed joint compound composition of claim 23, wherein the cellulose ether, where applicable, has a methyl or ethyl degree of substitution of 0.5 to 2.5, hydroxyethyl or hydroxypropyl molar substitution (MS) of 0.01 to 6, and molar substitution (MS) of the hydrophobic substituents of 0.01–0.5 per anhydroglucose unit.

25. The ready-mixed joint compound composition of claim 23, wherein the cellulose ether is selected from the group consisting of MHEC, MHPC, HMHEC, and mixtures thereof and a guar derivative additive is present.

26. The ready-mixed joint compound composition of claim 25, wherein the guar derivative is selected from the group consisting of hydroxypropyl guar, methylhydroxypropyl guar, carboxymethyl guar, carboxymethylhydroxypropyl guar, cationically modified guar and mixtures thereof.

27. The ready-mixed joint compound composition of claim 23, wherein the cellulose ether has a 2% aqueous solution Brookfield viscosity of greater than 80,000 mPas as measured on a Brookfield RVT viscometer at 20° C. and 20 rpm, using a spindle number 7.

28. The ready-mixed joint compound composition of claim 23, wherein the cellulose ether has a 2% aqueous solution Brookfield viscosity of greater than 90,000 mPas as measured on a Brookfield RVT viscometer at 20° C. and 20 rpm, using a spindle number 7.

29. The ready-mixed joint compound composition of claim 20, wherein the joint compound composition also comprises one or more conventional cellulose ethers selected from the group consisting of methylcellulose (MC), methylhydroxyethylcellulose (MHEC), methylhydroxypropylcellulose (MHPC), hydroxyethylcellulose (HEC), ethylhydroxyethylcellulose (EHEC), hydrophobically modified hydroxyethylcellulose (HMHEC), hydrophobically modified ethylhydroxyethylcellulose (HMEHEC), methylethylhydroxyethylcellulose (MEHEC), sulfoethyl methylhydroxyethylcelluloses (SEMHEC), sulfoethyl methylhydroxypropylcelluloses (SEMHPC), and sulfoethyl hydroxyethylcelluloses (SEHEC).

30. The ready-mixed joint compound composition of claim 20, wherein the amount of cellulose ether is from 0.001 to 2 wt %.

31. The ready-mixed joint compound composition of claim 20, in combination with at least one additive selected form the group consisting of organic or inorganic thickening agents, anti-sag agents, air entraining agents, wetting agents, defoamers, dispersants, calcium-complexing agents, retarders, accelerators, redispersible powders, biopolymers, and fibres.

32. The ready-mixed joint compound composition of claim 31, wherein the additive is the organic thickening agent selected from the group consisting of starch ether, starch, guar, guar derivatives, xanthan gum, welan gum, gellan gum, carrageenan, alginate, and cellulose fibres.

33. The ready-mixed joint compound composition of claim 31, wherein the at least one additive is selected from the group consisting of homo- or co-polymers of acrylamide, polyethylene glycol, casein, naphthalene-sulfonate, sulfonated melamine-formaldehyde condensate, sulfonated naphthalene-formaldehyde condensate, polyacrylates, polycarboxylate ether, phosphates, phosphonates, bentonite, montmorillonite, sepiolite, and homo-, co-, or terpolymers based on vinyl acetate, maleic ester, ethylene, butadiene, vinyl versatate, and acrylic monomers.

34. The ready-mixed joint compound composition of claim 20, wherein the binder is selected from the group consisting of ethylene vinyl acetate latex, poly (vinyl acetate) latex, starch, casein, polyacrylamide and copolymers of acrylamide and acrylic acid.

35. The ready-mixed joint compound composition of claim 20, wherein the binder is present in the amount of lower limit of 1 wt % and an upper limit of 5 wt %.

36. The ready-mixed joint compound composition of claim 35, wherein the binder is present in the amount of an upper limit of 2.5 wt %.

37. The ready-mixed joint compound composition of claim 20, wherein the filler is selected from the group consisting of calcium carbonate, calcium sulfate dihydrate, and dolomitic limestone, and mixtures thereof.

38. The ready-mixed joint compound composition of claim 37, wherein the filler also contains calcium sulfate hemihydrate.

39. The ready-mixed joint compound composition of claim 20, wherein a pH modifier is present in order to maintain a pH of 8 to 10.

40. The ready-mixed joint compound composition of claim 20, wherein clay or mica or mixtures thereof are present.

41. The ready-mixed joint compound composition of claim 40, wherein mica is only present.

42. The ready-mixed joint compound composition of claim 40, wherein clay is only present.

43. The ready-mixed joint compound composition of claim 42, wherein the clay is attapulgite.

44. The ready-mixed joint compound composition of claim 40, wherein a mixture of clay and mica is present.

45. The ready-mixed joint compound composition of claim 40, wherein the clay is selected from the group consisting of sepiolite, montmorillonite, bentonite, illite, kaolin, and attapulgite.

46. The ready-mixed joint compound composition of claim 40, wherein the clay is present in the amount upper limit of 0.5 weight %.

47. The ready-mixed joint compound composition of claim 40, wherein the clay is present in the amount upper limit of 0.75 weight %.

48. The ready-mixed joint compound composition of claim 40, wherein the clay is present in the amount upper limit of 3.5 weight %.

49. The ready-mixed joint compound composition of claim 40, wherein the mica amount has an upper limit of 5.0 weight %.

50. The ready-mixed joint compound composition of claim 20, wherein perlite is present.

51. The ready-mixed joint compound composition of claim 50 wherein the perlite amount has an upper limit of 8 weight %.

52. The ready-mixed joint compound composition of claim 20, wherein the density of the composition is 8 to 10 pounds per gallon (ppg).

53. The ready-mixed joint compound composition of claim 20, wherein the density of the composition is 12 to 14 ppg.

54. The ready-mixed joint compound composition of claim 20, wherein the significantly reduced amount of the cellulose ether used in the joint compound paste is at least 5% reduction.

55. The ready-mixed joint compound composition of claim 20, wherein the significantly reduced amount of the cellulose ether used in the joint compound paste is at least 10% reduction.

* * * * *